United States Patent [19]

Wurzburg et al.

[11]  4,166,173

[45]  Aug. 28, 1979

[54] PROCESS FOR PHOSPHORYLATING STARCH IN ALKALI METAL TRIPOLYPHOSPHATE SALTS

[75] Inventors: Otto B. Wurzburg, Whitehouse Station; Wadym Jarowenko, Plainfield; Roger W. Rubens, Somerville; Jayant K. Patel, North Plainfield, all of N.J.

[73] Assignee: National Starch and Chemical Corporation, Bridgewater, N.J.

[21] Appl. No.: 905,272

[22] Filed: May 15, 1978

[51] Int. Cl.² ............................................. C08B 31/02
[52] U.S. Cl. ................................... 536/109; 252/182; 536/49; 536/107; 536/108; 536/110
[58] Field of Search .................. 252/182; 536/109, 49, 536/107, 108, 110

[56] References Cited

U.S. PATENT DOCUMENTS

| | | | |
|---|---|---|---|
| 2,806,026 | 9/1957 | Evans | 260/233.3 |
| 2,824,870 | 2/1958 | Neukom | 260/233.5 |
| 2,884,413 | 4/1959 | Kerr | 260/233.5 |
| 3,132,066 | 5/1964 | Kerr et al. | 162/175 |
| 3,459,632 | 8/1969 | Caldwell et al. | 162/175 |
| 3,553,195 | 1/1971 | Jarowenko | 536/109 |

FOREIGN PATENT DOCUMENTS 36806  11/1965  German Democratic Rep. ..... 536/109

*Primary Examiner*—Melvyn I. Marquis
*Attorney, Agent, or Firm*—Edwin Szala; Janet E. Hasak

[57] ABSTRACT

Starch is phosphorylated by an improved pollution-free process which involves forming a reagent solution of an alkali metal tripolyphosphate salt in water having 20–36% by weight of the salt dissolved therein, forming a starch cake containing no more than 45% by weight moisture, adding 2–30% by weight of the tripolyphosphate salt reagent solution to the starch cake, and drying and heat-reacting the thus-impregnated starch. In this process more efficient impregnation of the starch is achieved. The impregnation is preferably effected in a centrifuge.

10 Claims, No Drawings

PROCESS FOR PHOSPHORYLATING STARCH IN ALKALI METAL TRIPOLYPHOSPHATE SALTS

BACKGROUND OF THE INVENTION

I. Field of the Invention

This invention relates to an improved process for phosphorylating starch. More particularly, this invention is directed to an improved process for preparing orthophosphate starch monoesters using a concentrated solution of alkali metal tripolyphosphate salt.

II. Description of the Prior Art

Phosphorylation reactions of starch, wherein starch is impregnated with a phosphate salt and thereafter dried and heat-reacted to obtain an orthophosphate starch monoester, are well known in the art.

Numerous patents such as U.S. Pat. Nos. 2,806,026; 2,824,870; 2,884,412; 2,884,413; 2,961,440; and 3,132,066 disclose various phosphorylation techniques whereby the impregnation step is accomplished by adding the phosphate salt to the starch, either by spraying an aqueous solution of the salt on the dry starch or by adding salt to an aqueous slurry of starch and filtering or centrifuging the starch slurry, then drying by conventional means. Spray-drying may be used in place of filtration or centrifugation but it is a very costly operation.

The suspension method of impregnation, which was deemed necessary to insure even distribution and/or penetration of the reagent into the starch granules, has serious disadvantages because of the resulting filtrates which must be disposed of. The excess phosphate salt, which does not penetrate the starch is lost to the filtrate and fed into the effluent, creating serious pollution problems. In commercial processes about 60% of the phosphate salt in the reagent solution is lost in the effluent.

In an effort to avoid the pollution problems caused by suspension impregnations, an alternative method of impregnation of starch with phosphate salt was proposed in E. Ger. Pat. No. 36,806. This method involves spraying dry, powdered starch with a concentrated solution of the phosphate salt or blending a wet starch cake with dry, powdered phosphate salt. In a third variation of this pollution-free impregnation, dry starch and dry salt are blended together and then sprayed with water to achieve dissolution of the phosphate salt and to distribute it evenly throughout the starch.

While the E. Ger. process represents an improvement over the suspension method of impregnation because pollution is minimized, it has several inherent disadvantages. Thus, the variation wherein dry reagent is added to wet starch cake requires special delivery equipment to sift the powdered reagent onto the wet starch. Blending dry starch with dry reagent requires prolonged mixing to achieve uniform distribution of the phosphate salt throughout the starch powder, resulting in poor granule penetration and, thus, low reaction efficiency. Moreover, the variation of spraying dry starch with phosphate salt solution, in addition to having the above disadvantage, involves a double drying procedure wherein the starch must be dried before use and dried again after spraying, adding appreciably to the cost of the process.

A further disadvantage of the E. Ger. process is that all of the mixing takes place in a blender so that metering of the reagent must be done carefully or the mixing done over a prolonged period of time to insure satisfactory distribution of the reagent within the starch. This becomes more critical when lower levels of substitution are desired and smaller amounts of reagent thus employed. Also such a blender is not a part of the processing equipment so that the phosphorylation process must be interrupted using this procedure. Moreover, the E. Ger. patent is directed, in particular, to use of orthophosphate salts as reagents and does not specifically mention tripolyphosphate salts, perhaps because of their low solubility and high pH.

Alkali metal tripolyphosphate salts are the preferred phosphate salts for phosphorylation reactions because they require a lower heat input for satisfactory phosphorylation and are, thus, most desirable from an energy standpoint. However, sodium tripolyphosphate, which is representative of this type of salt, has an overall solubility in water at 25° C. of only about 13% (see John von Wazer, "Phosphorus and Its Compounds," Vol. I: Chemistry, New York: Interscience Publishers, Inc., 1958, pp. 649–650). Thus, sodium tripolyphosphate solutions are dilute and must be used in large amounts in the impregnation step to achieve phosphorylation.

Accordingly, it is an object of the present invention to provide an improved pollution-free process for phosphorylating starch with alkali metal tripolyphosphate salts.

It is another object to provide a concentrated reagent solution of alkali metal tripolyphosphate salt useful for phosphorylating starch and a process for the preparation thereof.

SUMMARY OF THE INVENTION

The above and related objects are achieved in an improved process for phosphorylating starch comprising the steps of:

(a) forming a reagent solution of an alkali metal tripolyphosphate salt in water having 20–36% by weight of the salt dissolved therein;

(b) forming a starch cake having no more than 45% by weight moisture;

(c) adding 2–30% by weight of the reagent solution to the starch cake to achieve efficient impregnation of the cake;

(d) drying the thus-impregnated starch; and (e) heat-reacting the dried starch to obtain an orthophosphate starch monoester.

It is to be noted that the amount of reagent solution to be added to the starch cake as specified hereinabove is the amount of total solution, and not the amount based on solution solids.

In one preferred embodiment of this process, the impregnation is carried out in a centrifuge in a semi-continuous process.

The reagent solution of this invention contains water, 20–36% by weight of an alkali metal tripolyphosphate salt and an amount of a water-soluble acid having a $pK_a$ less than 4.7 sufficient to obtain a solution pH of 2.8–5.0. The amount of tripolyphosphate salt added is based on total weight of the solution.

Preferably, the tripolyphosphate salt employed is sodium tripolyphosphate, and the solution has 30–34% by weight of the salt dissolved therein. The solution preferably has a pH of 4.2–4.8. The preferred water-soluble acids used in the reagent solution herein are phosphoric, hydrochloric, sulfuric, nitric, formic, citric and chloroacetic acid, as well as sodium dihydrogen phosphate.

The process of this invention insures a more efficient impregnation of the starch, where very little of the reagent is lost to the effluent causing pollution problems. Additionally, the impregnation step may take place in a convenient apparatus, such as a centrifuge, which does not require special metering of reagent or prolonged mixing and does not require separate processing equipment, i.e., sprayers or mixers, which would interrupt the continuity of processing. Moreover, the reagent solution herein is particularly useful in processes carried out using standard equipment.

The orthophosphate starch monoesters prepared by the method herein may be used in any applications wherein such starch derivatives are employed such as in foods and paper. These starch derivatives are particularly useful as pigment retention aids in papermaking processes.

DESCRIPTION OF THE PREFERRED EMBODIMENTS

The term "orthophosphate starch monoesters" as used herein refers to simple, non-crosslinked esters of starch and orthophosphoric acid of the formula:

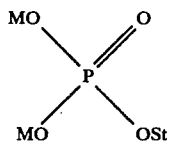

wherein M represents an alkali metal or hydrogen and St represents the starch residue.

Orthophosphate starch monoesters may be produced from many inorganic phosphate salts such as orthophosphates, metaphosphates, polymetaphosphates and pyrophosphates, as well as from tripolyphosphate salts. The invention herein is directed only to orthophosphoric starch monoesters prepared from tripolyphosphate salts.

The starches which may be employed in the process are any of those known to be used in preparing starch esters. Suitable starch bases include, for example, those starch bases derived from corn, hybrid corn, potato, rice, sago, tapioca, waxy maize, sorghum, wheat, and the various derivatives of these starches. Hence, among applicable starches are included the various starch derivatives such as ethers, esters, thin-boiling types prepared by known processes such as mild acid treatments, oxidative, etc., and those drivatives of these starches which have high amylose contents, i.e., 50% or more by weight of amylose. Typical starches useful herein are tapioca, amioca and corn starch. In papermaking operations, the preferred starch bases to be used are those which contain cationic groups such as quaternary ammonium or diethylaminoalkyl groups, and a particularly preferred starch herein is the diethylaminoethyl ether of corn starch. It is to be noted that the starch base employed herein must be in its granular form, i.e., it must be any amylaceous material which has not lost its granular polarization crosses and is capable of swelling. However, it is possible in the practice of this invention to employ a granular starch of which a small portion has been partially swelled by any known means or homogenized by subjecting it to shear.

The alkali metal tripolyphosphate salt used in solution form to impregnate the starch herein has two anhydride linkages, as shown in the formula below, which contribute to the greater phosphorylating efficiency of this salt:

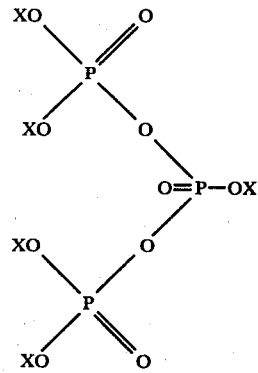

wherein X represents an alkali metal of group I of the Periodic Table. Examples of such salts include sodium tripolyphosphate, potassium tripolyphosphate, lithium tripolyphosphate, etc. The preferred salt herein is sodium tripolyphosphate because it is the least expensive and most readily available of the tripolyphosphate salts.

In the procedure for preparing the reagent solution, a sufficient amount of the alkali metal tripolyphosphate salt is added to water, in small increments, at a temperature no greater than 40° C., such that after the pH of the solution has been adjusted to within the range specified hereinbelow, the amount of salt dissolved therein will be between 20 and 36% by weight, and preferably 30–34%. The amount of salt dissolved in the solution will depend on the pH of the solution, the acid used to adjust the pH, etc. The maximum amount dissolved therein is the largest amount which can be added to give a solution which is still transparent. Cloudiness of the reagent solution indicates incomplete dissolution and is not desirable for the pollution-free process of this invention. The practitioner can dissolve the salt to any degree within the above-specified range; the desired amount dissolved will depend on the moisture in the starch cake to be impregnated, the method of impregnation, etc.

During addition of the tripolyphosphate salt to the water, one or more acids are added gradually to control the pH at between 2.8 and 5.0, and preferably between 4.2 and 4.8. The most effective pH of the solution will depend on the particular starch base employed, the end use of the product, and the length of storage of the reagent solution. It has been found that alkali metal tripolyphosphate salts, and, in particular, sodium tripolyphosphate, are more reactive at weakly acidic pH than at neutral or slightly alkaline pH. At pH greater than 5, the reagent solution will be less concentrated and also the subsequent phosphorylation reaction will require higher temperatures and/or longer exposure to the heat treatment. However, highly acidic conditions favor decomposition of the tripolyphosphate salt to pyrophosphate and orthophosphate salts, which are less reactive than tripolyphosphate salts and thus less desirable. As a result, the pH of the reagent solution must not be less than 2.8.

The acids which are added to the water together with the alkali metal tripolyphosphate salt to adjust the pH of the reagent solution may be chosen from among a wide variety of acids provided that the acids are water soluble and have a $pK_a$ value below 4.7. Acids with $pK_a$ above this maximum value, such as acetic acid, are not effective in allowing the alkali metal tripolyphosphate salt to dissolve to within the concentration range claimed herein. Among acids useful herein are inorganic acids such as phosphoric acid, sodium dihydrogen phosphate, hydrochloric, sulfuric and nitric acid. In addition, monocarboxylic acids such as, e.g., formic acid and chloroacetic acid, as well as polycarboxylic acids such as, e.g., citric, tartaric and malic and/or malonic acids, may be employed, with the provision that they have the properties prescribed hereinabove. Mixtures of such acids may also be employed.

The reagent solution of this invention is found to be stable at room temperature for at least several weeks. Thus, the solution may be used immediately after preparation to impregnate the starch, or may be stored in a sealed container and used when needed.

In the improved pollution-free process for phosphorylating starch disclosed herein, the starch is first impregnated with the reagent solution, followed by drying and heat-reacting by known procedures. The impregnation is accomplished by adding the reagent solution to a starch in cake form having a normal moisture content of no more than 45%, and preferably 35–44% by weight. The starch cake is ordinarily obtained by forming an aqueous slurry of the starch in water, which slurry is then dewatered to form a cake by any suitable means such as by centrifugation. If the starch cake contains too much water, the starch will be impossible to handle when impregnated using standard equipment.

The amount of reagent solution added to the starch cake for impregnation thereof will vary depending on the concentration and acidity of the reagent solution, the method used to form the starch cake, and the end-use of the starch product, but generally ranges from 2 to 30% by weight, based on the weight of the starch. In preparing amphoteric starches used in papermaking, e.g., as pigment retention aids, the amount of reagent solution added is preferably 3 to 10%, depending on the concentration of the solution. For preparing orthophosphate starch monoesters for food use, however, a larger amount of reagent solution is generally employed, e.g., 16–30% by weight.

In a preferred embodiment of the invention the impregnation is carried out in a centrifuge in a semi-continuous process. Thus, a slurry of starch is dewatered in the spinning basket of a centrifuge to obtain a cake of the desired moisture content, which cake is then sprayed with the reagent solution. During addition of the solution to the starch cake, a bypass in the centrifugation mechanism may be used to collect the filtrate, and the collected filtrate can then be added to the starch cake after it is removed from the centrifuge. The starch cake may be removed from the centrifuge by a plow and then introduced into a heavy-duty mixer wherein the cake is broken up into pieces before being conveyed to the drier.

After the reagent solution has been added to the starch cake, the thus-impregnated starch is dried to a moisture content of less than 20% and heat-reacted by any of the known procedures. Hence, as described in U.S. Pat. No. 2,884,413, incorporated herein by reference, the starch may be dried in typical starch driers such as those wherein heated air is forced through the drier. The alternative method wherein the impregnated starch is dried in a flash drier and heat-reacted in any equipment designed for heating starch is also applicable to the present method.

It is to be recognized that the process of this invention is not limited to any particular method of drying the starch and that the improvement and novelty of the invention reside in the impregnation step, wherein a novel, highly concentrated solution of reagent is added to a starch cake such that the reagent uniformly penetrates the starch.

The resultant product obtained by the process of this invention is an orthophosphate starch monoester useful in any applications wherein such esters are employed. For example, a cationic starch may be phosphorylated by the process herein to produce an amphoteric starch useful as a pigment retention aid in papermaking.

The following examples will illustrate various embodiments of the present invention. In the examples, all parts and percentages are given by weight and all temperatures in degrees Celsius unless otherwise noted.

EXAMPLE I

This example illustrates the preparation of a reagent solution of sodium tripolyphosphate in accordance with the present invention.

To a total of about 100 parts water in a jacketed container were added, in sequential increments with stirring, 64.7 parts sodium tripolyphosphate, 11.8 parts of 87% phosphoric acid, and 12.1 parts of 37% hydrochloric acid to attain a final pH of 4.4–4.8. The temperature of the mixture was maintained at or below 37° C. through some jacket water cooling. The resulting solution was clear, and when analyzed by refractive index and NMR spectrometry, was found to contain 34% sodium tripolyphosphate dissolved therein. The reagent solution was stored at room temperature.

EXAMPLE II

This example illustrates the impregnation of starch with the novel tripolyphosphate salt solution of this invention, wherein the impregnation step is carried out in a centrifuge.

Corn starch was reacted with diethylaminoethyl chloride hydrochloride in accordance with the procedure described in U.S. Pat. No. 3,459,632, Example I, Part A. The resulting diethylaminoethyl ether of corn starch was acidified to pH 3.2, washed in a MERCO (trademark of Dorr-Oliver, Inc.) Washing Centrifuge and collected in a MERCO underflow tank. The starch was then pumped in slurry form to a dewatering centrifuge, manufactured by Reineveld, having a bowl diameter of 68 in. (163 cm.) and a basket depth of 33.5 in. (85.1 cm.) with a rotation speed of 850 rpm. A normal "fast-fill," "slow-fill" cycle of about 5 minutes was used to load the centrifuge basket, which holds about 1270 (577 kg.) of starch at 39% moisture. After the filling cycle, the centrifuge entered a spin cycle for five minutes in which the starch cake, having a thickness of 8 in. (20.3 cm.), was dewatered. The filtrate was collected in the filtrate tank during the spin cycle. Meanwhile, 47 lb. (21.4 kg.) of the reagent solution of Example I were weighed on a scale and piped into the inlet of a gear pump. The pump discharged into a spray manifold with eight spray nozzles located in the centrifuge with the spray pattern directed at the spinning starch cake. After the starch was dewatered in the five-minute spin cycle, the reagent solution (containing 0.38% total phosphorus based on anhydrous starch) was sprayed onto the starch cake over about a 1.5-min. period. At the same time, a valve in the filtration line was closed and a bypass stream opened to a container so that the filtrate which was collected during the addition of reagent solution, and for two minutes of spin thereafter, could be separated from the filtrate collected during "normal" dewatering. After addition of the reagent solution, the impregnated starch cake was spun for two minutes and then discharged by centrifuge plow into a heavy-duty mixer. The filtrate collected from the by-pass during salt addition was sampled and then added slowly to the cake in the heavy-duty mixer. Thus, any salt remaining in the filtrate was recycled and did not pass out into the system effluent.

The starch was then conveyed to a flash drier wherein it was dried to about 5–8% moisture. After drying, the impregnated starch was heat-reacted in a continuous, rotary steam tube device. At the discharge end, the starch reached temperatures of about 110–130° C. The dried, reacted starch was then packed into a number of individual bags in order to be sampled periodically and analyzed for reagent distribution.

The distribution of the salt solution throughout the starch cake was determined by analyzing spot samples (usually every fifth or tenth bag) of the starch product for total phosphorus content. To determine phosphorus content, a known gravimetric procedure was employed whereby the sample was acid-hydrolyzed to convert all forms of the phosphate into the orthophosphate form, which was then precipitated out as quinoline-phosphomolybdate. Composite samples of the filtrate collected during impregnation of the starch were also analyzed for phosphorus content using standard procedures. The results are given in Table I.

TABLE I

| Samples (Bag Number) | Total Phosphorous Content (% by weight, dry basis) |
|---|---|
| 1 | 0.34 |
| 5 | 0.31 |
| 10 | 0.32 |
| 20 | 0.40 |
| 35 | 0.33 |
| 45 | 0.41 |
| 85 | 0.39 |

The total amount of phosphorus in the starch cake is seen to follow a distribution which is consistent with the method of impregnation. Homogeneity was improved, relative to initial distribution within the centrifuge cake, by subsequent mixing in the heavy-duty mixer and during drying, heat reaction and final conveying, storage and packing. Small amounts of phosphorus, in the range of 30–60 ppm, were found in the samples of the filtrate, indicating that most of the salt in the solution was retained by the starch cake, thereby minimizing pollution of the effluent.

EXAMPLE III

This example illustrates the effectiveness of the starch derivatives prepared by the process of this invention as pigment retention aids in paper.

A total of 200 parts cationic corn starch prepared as described in Example II was suspended in 250 parts tap water. The pH of the resulting slurry was adjusted to 4.2 to 4.8 with dilute sodium hydroxide or hydrochloric acid solution and the starch separated from the slurry in a laboratory-size basket centrifuge. After the starch was sufficiently dewatered, about 6 parts of the reagent solution of Example I having a pH of 4.6 was added to the starch cake in the spinning centrifuge. During addition of the reagent solution about 5 parts of liquid were displaced from the wet cake and collected from the by-pass stream in a suitable container.

After impregnation the starch cake was removed from the centrifuge, placed in the bowl of a mixer, and allowed to mix for about 5 min. After this period the liquid collected from the centrifugation step was blended with the starch cake. The cake was in crumb form and easy to handle during the course of the mixing operation. The impregnated starch thus mixed was then dried rapidly with hot air (of 132.5° C.) to a moisture level of 6% or less, whereupon the starch attained a temperature of about 100° C. No additional heat treatment was applied.

The above procedure was repeated three more times with reagent solutions having a pH of 4.8, 4.2 and 4.5, respectively. The products were dried to the moisture levels indicated in Table II. The resulting four products were found to contain 0.35–0.40% total phosphorus by weight and about 0.07% bound phosphorus.

Each starch product prepared above, designated as A–D in Table II, was divided into three portions, and each portion was dispersed by cooking at atmospheric pressure in a conventional manner. The cooked portions were thereafter added at a concentration of 0.25%, based on the weight of the dry pulp, to a bleached soft wood pulp beaten to 600 Canadian Standard Freeness, which contained a varied amount of paper alum, i.e., aluminum sulfate, and 10% titanium dioxide, based on the weight of pulp and alum. The three pulps for evaluation of each starch product contained respectively 0, 4.0 and 11.0 percent, by weight, of alum, based on the dry pulp. In each case, the pigment retention value of the test paper stock and those of a control were determined by first preparing hand-made sheets on the Williams Standard Sheet Mold and then testing for the percent of titanium dioxide retained by the method described in TAPPI, Standard #T 413 m. 58. The control consisted of a standard commercial orthophosphate starch monoester prepared using the suspension method of impregnation, i.e., the phosphorylated, diethylaminoethyl ether of corn starch, containing 0.32% nitrogen and 0.08% phosphorus by weight, prepared as described in U.S. Pat. No. 3,459,632. The pigment retention values of the starch products A–D, expressed as a percent of the pigment retention value of the control, are given in Table II.

TABLE II

| Starch Product | Moisture Content of Starch Product (% by weight) | pH of Reagent Solution Used to Impregnated Starch | Pigment Retention (as a percent of control) in the presence of the following amounts of alum* | | |
|---|---|---|---|---|---|
| | | | 0 | 4.0 | 11.0 |
| A | 6.0 | 4.6 | 101 | 94 | 95 |
| B | 3.0 | 4.8 | 106 | 99 | 98 |
| C | 6.0 | 4.2 | 101 | 91 | 92 |
| D | 3.0 | 4.5 | 107 | 105 | 100 |

*Based on the percent, by weight, of the dry pulp, yielding pH values of 7.6, 6.0, and 4.6, respectively.

The results indicate that the pigment retention ability of the orthophosphate starch monoester prepared by the process of this invention is comparable to that of a commercial orthophosphate starch monoester prepared by using the suspension method of impregnation employed in the prior art.

A starch impregnated with a reagent solution prepared as in Example I using potassium tripolyphosphate instead of sodium tripolyphosphate yielded comparable results.

EXAMPLE IV

This example illustrates the preparation of the reagent solution of this invention using various inorganic and organic acids.

The reagent solutions designated as A-G in Table III were prepared as follows:

A total of 64.7 g. of sodium tripolyphosphate was added with continuous stirring to 100 ml. water while the pH of the mixture was maintained at about 4.5 using the indicated acid. The temperature was maintained below 37° C. by water-jacket cooling. The resulting solutions were clear, and the final concentration of sodium tripolyphosphate in the respective solutions is indicated in Table III.

Use of acetic acid (having a $pK_a$ of 4.75) to adjust the pH of the reagent solution was not effective and resulted in a cloudy suspension having only a small amount of sodium tripolyphosphate dissolved therein.

TABLE III

| Reagent Solution | Sodium Tripolyphosphate Content (% by weight) | Acid | $pK_a$ of Acid* | Amount of Acid in Solution (% by weight) |
|---|---|---|---|---|
| A | 34.6 | hydrochloric | none** | 11.8 |
| B | 36.4 | sulfuric | 1.92 | 7.5 |
| C | 29.9 | citric | 3.14 | 14.7 |
| D | 34.8 | nitric | none** | 11.5 |
| E | 34.2 | phosphoric | 2.12 | 12.6 |
| F | 32.4 | chloroacetic | 2.12 | 12.6 |
| G | 32.4 | formic | 3.75 | 3.8 |

*In aqueous solution at 250° C. and at 0.1-0.01 N (Handbook of Chemistry and Physics, Weast, 55th Ed., Chemical Rubber Co., 1974-75)
**dissociated completely.

About 3% of each reagent solution A-G was used to impregnate the starch cake of Example II using the impregnation procedure described in Example II. The thus-impregnated starch cakes were dried in a flash drier in which the air temperature was about 130° C. and were then heat-reacted. The resultant starch products were analyzed and found to contain between 0.07 and 0.1% bound phosphorus by weight. These results indicate that many different acids can be used to prepare the reagent solution of this invention (containing at least 20% sodium tripolyphosphate), provided that the acids have a $pK_a$ value less than about 4.7.

EXAMPLE V

This example illustrates the stability of the reagent solutions of this invention.

The reagent solutions designated as A-F in Table IV were prepared as follows, with the exception of Solution C:

A total of 50 or 55 g. of sodium tripolyphosphate was added with continuous stirring to 85 ml. water while the pH was adjusted to the indicated value with the given acid or mixture of acids. The temperature was maintained below 37° C. by cooling.

Solution C: The sodium dihydrogen phosphate was first added in the amount indicated to 55 parts water, followed by addition of sodium tripolyphosphate intermittently with phosphoric acid to obtain a solution having the given pH value.

The resulting six solutions were clear and had the sodium tripolyphosphate salt concentration indicated in Table IV.

TABLE IV

| Reagent Solution | Sodium Tripolyphosphate Content (% by weight) | Phosphoric Acid (parts) | Sodium Dihydrogen Phosphate (parts) | Hydrochloric Acid (parts) | Solution pH |
|---|---|---|---|---|---|
| A | 32.6 | 18.6 | — | — | 4.6 |
| B | 33.0 | 16.6 | — | — | 4.7 |
| C | 32.3 | 24.8 | 5.5 | — | 4.7 |
| D | 34.3 | 10.0 | — | 10.2 | 4.5 |
| E | 34.8 | 11.3 | — | 6.7 | 4.5 |
| F | 33.5 | 10.0 | — | 14.0 | 4.3 |

Reagent solutions A-C were aged at room temperature in a closed container for three weeks, Solution D for two weeks, and Solutions E and F for one week.

In the impregnation step, the cationic starch derivative of Example II was suspended in water, adjusted to the pH of the impregnating reagent solution, and then filtered. The resulting starch cake, containing 42% moisture, was blended in a heavy-duty mixer with about 3%, based on starch weight, of each aged reagent solution A-F, dried and heat-reacted at 132° C. The resulting starch products were found to contain 0.07-0.1% by weight phosphorus, indicating that aging of the reagent solutions does not affect their ability to react with the starch.

EXAMPLE VI

This example illustrates the use of various starch bases in the process of this invention.

The procedure of Example III was followed except that tapioca, amioca and native corn starch were used instead of cationic corn starch. The results obtained were comparable with those shown in Table II.

Summarizing, this invention is seen to provide an improved pollution-free process for phosphorylating starch using a concentrated reagent solution of alkali metal tripolyphosphate salt.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. An improved process for phosphorylating starch comprising the steps of:
   (a) forming a reagent solution of an alkali metal tripolyphosphate salt which comprises water, 20-36% by weight of said salt, and an amount of a water-soluble acid having a $pK_a$ less than 4.7 sufficient to obtain a solution pH of 2.8-5.0;
   (b) forming a starch cake having no more than 45% by weight moisture;
   (c) adding 2-30% by weight of said reagent solution to said starch cake to achieve efficient impregnation of the cake;
   (d) drying the thus-impregnated starch; and
   (e) heat-reacting the dried starch to obtain an orthophosphate starch monoester.

2. The process of claim 1 wherein steps (b) and (c) are carried out in a centrifuge.

3. The process of claim 1 wherein said starch cake has 35–44% by weight moisture.

4. The process of claim 1 wherein 3–10% by weight of said reagent solution is added to said starch cake.

5. A reagent solution of alkali metal tripolyphosphate salt which comprises water, 20–36% by weight of said salt, and an amount of a water-soluble acid having a $pK_a$ less than 4.7 sufficient to obtain a solution pH of 2.8–5.0.

6. Claims 1 or 5 wherein said alkali metal tripolyphosphate salt is sodium tripolyphosphate.

7. Claims 1 or 5 wherein 30–34% by weight of said tripolyphosphate salt is dissolved in said reagent solution.

8. The reagent solution of claim 5 wherein the pH is 4.2–4.8.

9. The reagent solution of claim 5 wherein said water-soluble acid is selected from the group consisting of phosphoric acid, hydrochloric acid, sulfuric acid, nitric acid, formic acid, citric acid, chloroacetic acid, and sodium dihydrogen phosphate.

10. A process for preparing a reagent solution of alkali metal tripolyphosphate salt which comprises mixing, at a temperature no greater than 40° C., an alkali metal tripolyphosphate salt, water and a water-soluble acid having a $pK_a$ less than 4.7 to obtain a reagent solution having a pH of 2.8–5.0 and having 20–36% by weight of said tripolyphosphate salt dissolved therein.

* * * * *